US012103317B2

(12) United States Patent
Usui

(10) Patent No.: US 12,103,317 B2
(45) Date of Patent: Oct. 1, 2024

(54) PRINTING DEVICE AND PRINTING METHOD

(71) Applicant: SEIKO EPSON CORPORATION, Tokyo (JP)

(72) Inventor: Masaya Usui, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 18/069,262

(22) Filed: Dec. 21, 2022

(65) Prior Publication Data

US 2023/0202195 A1 Jun. 29, 2023

(30) Foreign Application Priority Data

Dec. 23, 2021 (JP) ................................ 2021-209012

(51) Int. Cl.

| | |
|---|---|
| ***B41J 2/21*** | (2006.01) |
| ***B41J 2/12*** | (2006.01) |
| ***B41J 2/155*** | (2006.01) |
| ***B41J 29/38*** | (2006.01) |
| ***B41J 29/393*** | (2006.01) |
| ***B41M 5/00*** | (2006.01) |

(52) U.S. Cl.

CPC ............... *B41J 2/2146* (2013.01); *B41J 2/12* (2013.01); *B41J 2/155* (2013.01); *B41J 29/38* (2013.01); *B41J 29/393* (2013.01); *B41M 5/00* (2013.01); *B41J 2029/3935* (2013.01)

(58) Field of Classification Search

CPC ... B41J 2/2146; B41J 2/12; B41J 2/155; B41J 29/38; B41J 29/393; B41J 2029/3935; B41M 5/00

See application file for complete search history.

(56) References Cited

U.S. PATENT DOCUMENTS

| | | | | |
|---|---|---|---|---|
| 2007/0040878 | A1 | 2/2007 | Ikefuji et al. | |
| 2021/0402758 | A1 | 12/2021 | Ohara | |
| 2021/0402760 | A1* | 12/2021 | Iida | H04N 1/605 |
| 2022/0247888 | A1* | 8/2022 | Schweid | B41J 2/2054 |
| 2022/0396083 | A1* | 12/2022 | Takeuchi | B41J 11/007 |

FOREIGN PATENT DOCUMENTS

| | | | |
|---|---|---|---|
| JP | 2007-054970 | A | 3/2007 |
| JP | 2022-011429 | A | 1/2022 |

* cited by examiner

*Primary Examiner* — Henok D Legesse

(74) *Attorney, Agent, or Firm* — Global IP Counselors, LLP

(57) ABSTRACT

A printing device comprising a printing head including a plurality of nozzles configured to discharge ink to a printing medium are arranged, and a control unit configured to control discharge of the ink. The printing head is configured to discharge the ink along with scanning that is a relative movement in a predetermined direction with respect to the printing medium, and in test printing for printing a TP on the printing medium, the control unit performs control such that the ink of a first discharge amount is discharged from the nozzles when a color difference between the TP and the printing medium is greater than a predetermined threshold value, and the ink of a second discharge amount that is greater than the first discharge amount is discharged when the color difference between the TP and the printing medium is equal to or smaller than the threshold value.

8 Claims, 7 Drawing Sheets

50

| INK COLOR | DISCHARGE AMOUNT [pl] | |
|---|---|---|
| | FIRST INK | SECOND INK |
| Black | 20 | 22 |
| Cyan | 20 | 22 |
| Magenta | 20 | 22 |
| Yellow | 20 | 22 |
| Light Magenta | 20 | 22 |
| Light Cyan | 20 | 22 |

FIG. 7

51

| INK COLOR | NUMBER OF PATHS | |
|---|---|---|
| | FIRST INK | SECOND INK |
| Black | 1 | 2 |
| Cyan | 1 | 2 |
| Magenta | 1 | 2 |
| Yellow | 1 | 2 |
| Light Magenta | 1 | 2 |
| Light Cyan | 1 | 2 |

FIG. 8

PRINTING DEVICE AND PRINTING METHOD

The present application is based on, and claims priority from JP Application Serial Number 2021-209012, filed Dec. 23, 2021, the disclosure of which is hereby incorporated by reference herein in its entirety.

BACKGROUND

1. Technical Field

The present disclosure relates to a printing device and a printing method.

2. Related Art

A technique has been disclosed in which in an ink-jet printing device, a test pattern is printed on a printing sheet with a printing head, the test pattern is read with a scanner, and abnormality of a nozzle is determined based on the read data (see JP-A-2007-54970).

In the technique disclosed in JP-A-2007-54970, however, in the case where the difference between the color of the printing sheet and the color of the ink is small, the detection accuracy of the test pattern may be reduced and the inspection may not be appropriately performed. As such, there is a demand for a suitable test pattern for appropriately executing the inspection after the reading.

SUMMARY

A printing device includes a printing head including a nozzle row in which a plurality of nozzles configured to discharge liquid to a medium are arranged, and a control unit configured to control discharge of the liquid from the plurality of nozzles. The printing head is configured to discharge the liquid along with scanning that is a relative movement in a predetermined direction with respect to the medium, and in test printing for printing a test pattern on the medium, the control unit performs control such that the liquid of a first discharge amount is discharged from the nozzle when a color difference between the test pattern and the medium is greater than a predetermined threshold value, and the liquid of a second discharge amount that is greater than the first discharge amount is discharged from the plurality of nozzles when the color difference between the test pattern and the medium is equal to or smaller than the threshold value.

A printing method is a method of a printing device provided with a printing head including a nozzle row in which a plurality of nozzles configured to discharge liquid to a medium are arranged, the printing device being configured to discharge the liquid from the printing head along with scanning that is a relative movement in a predetermined direction with respect to the medium, the printing method including a test printing step of printing a test pattern on the medium, the test printing step including a first determination step of determining, to a first discharge amount, a discharge amount of the liquid to be discharged from the nozzle when a color difference between the test pattern and the medium is greater than a predetermined threshold value, and a second determination step of determining, to a second discharge amount that is greater than the first discharge amount, the discharge amount of the liquid to be discharged from the nozzle when the color difference between the test pattern and the medium is equal to or smaller than the threshold value.

BRIEF DESCRIPTION OF THE DRAWINGS

FIG. 7 is a diagram illustrating an example of a color-by-color discharge amount table.

FIG. 8 is a diagram illustrating an example of a color-by-color path count table.

DESCRIPTION OF EXEMPLARY EMBODIMENTS

1. Embodiment 1

Embodiment 1 is described below with reference to the drawings. Note that the drawings are merely examples for describing Embodiment 1. Since the drawings are examples, they may not be precise in proportions and shapes, may not match each other, and may be partially omitted.

1-1. Device Configuration

Figure 1:
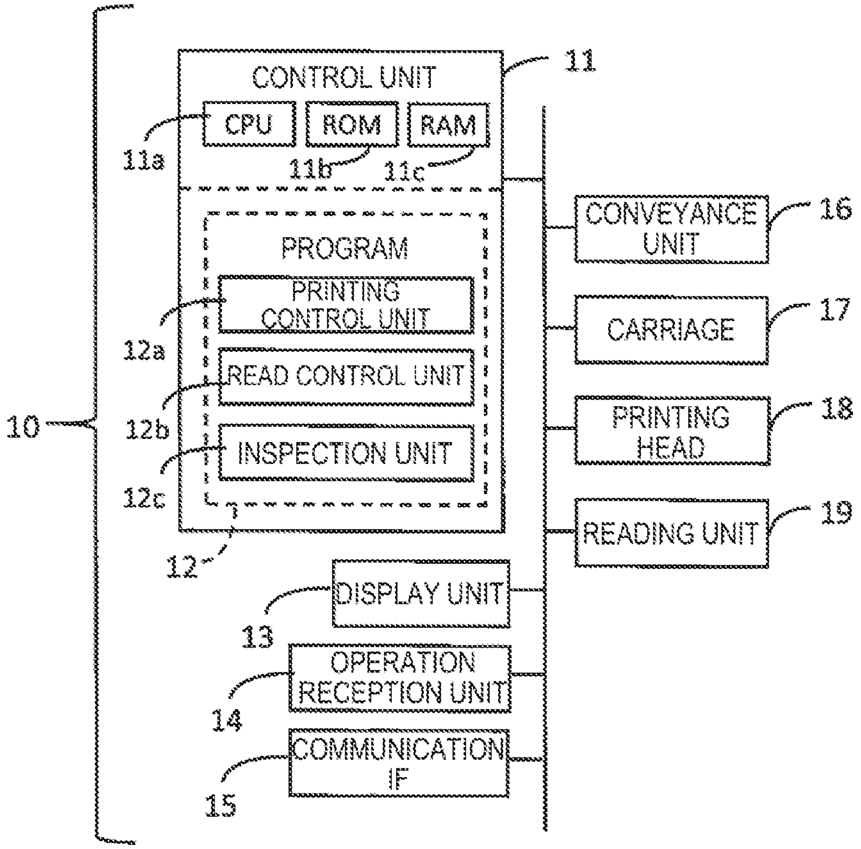
FIG. 1 is a block diagram schematically illustrating a device configuration.

FIG. 1 schematically illustrates a configuration of a printing device 10 according to this embodiment.

The printing device 10 is a device that performs printing by discharging ink as liquid to a printing medium 30 as a medium (see FIG. 2), and includes a control unit 11, a display unit 13, an operation reception unit 14, a communication IF 15, a conveyance unit 16, a carriage 17, a printing head 18, a reading unit 19 and the like. IF is an abbreviation of interface. The control unit 11 has a configuration including one or a plurality of ICs including a CPU 11*a* serving as a processor, a ROM 11*b*, a RAM 11*c* and the like, other nonvolatile memories, and the like.

In the control unit 11, the processor, i.e., the CPU 11*a* executes arithmetic processing in accordance with one or more programs 12 stored in the ROM 11*b*, other memories and the like with the RAM 11*c* and the like used as the work area, so as to implement various functions such as a printing control unit 12*a*, a read control unit 12*b* and an inspection unit 12*c*. Note that the processor is not limited to one CPU, and may have a configuration of performing processing with a plurality of CPUs and a hardware circuit such as an ASIC, or a configuration of performing processing with the CPU and the hardware circuit in conjunction with each other.

The display unit 13 is a means for displaying visual information and is composed of a liquid crystal display, an organic EL display or the like, for example. The display unit 13 may have a configuration including a display and a driving circuit for driving the display. The operation reception unit 14 is a means for receiving the user operation and is implemented with a physical button, a touch panel, a mouse, a keyboard and the like, for example. Naturally, the touch panel may be implemented as a function of the display unit 13.

While the display unit 13 and the operation reception unit 14 may be a part of the configuration of the printing device 10, it may be a peripheral device externally attached to the printing device 10. The communication IF 15 is a collective term of one or a plurality of IFs for the printing device 10 to connect to the outside in a wired or wireless manner in compliance with a predetermined communication protocol including a publicly known communication standard.

The conveyance unit 16 is a means for conveying the printing medium 30, and includes a roller and a motor for rotating the roller and the like. The printing head 18 performs printing by discharging ink from a nozzle to the printing medium 30 by an ink-jet method. The reading unit 19 is a means for acquiring the color information of the printing medium 30, and reading a printing result at the printing medium 30. The reading unit 19 is referred to also as scanner. It should be noted that the printing device 10 may not include the reading unit 19.

Figure 2:
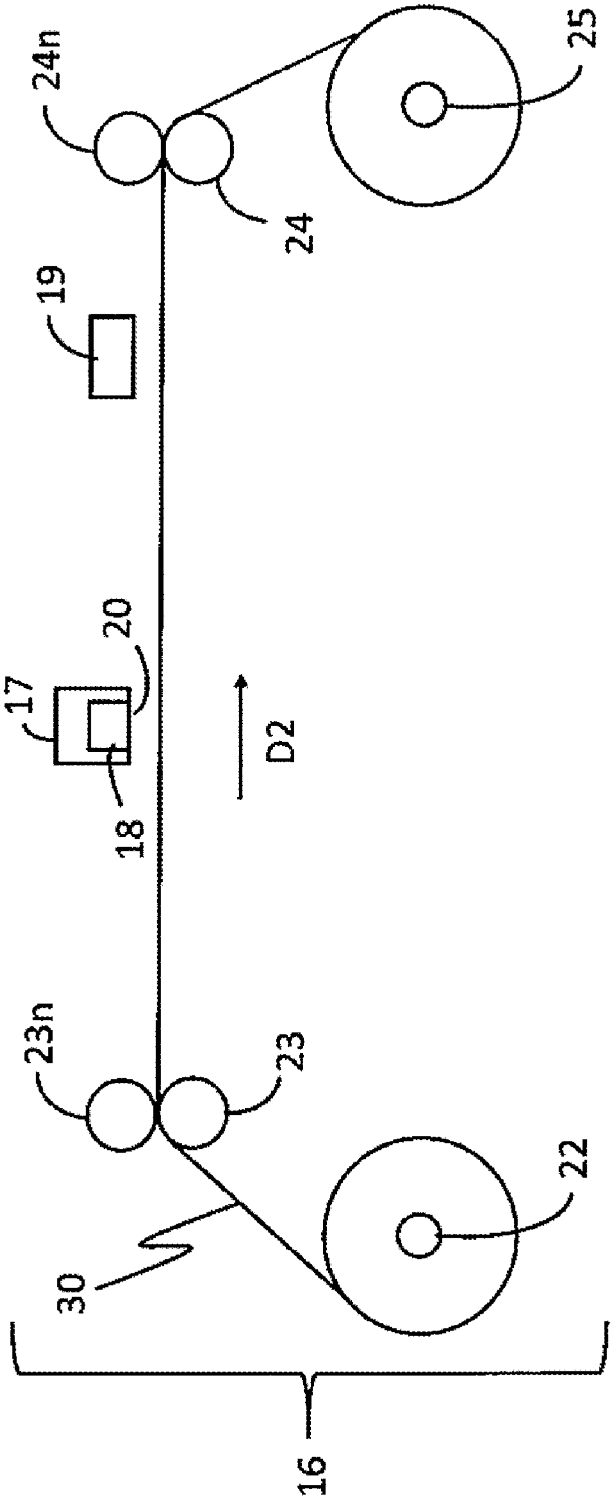
FIG. 2 is a diagram illustrating a specific example of a configuration including a conveyance unit and a printing head.
Figure 3:
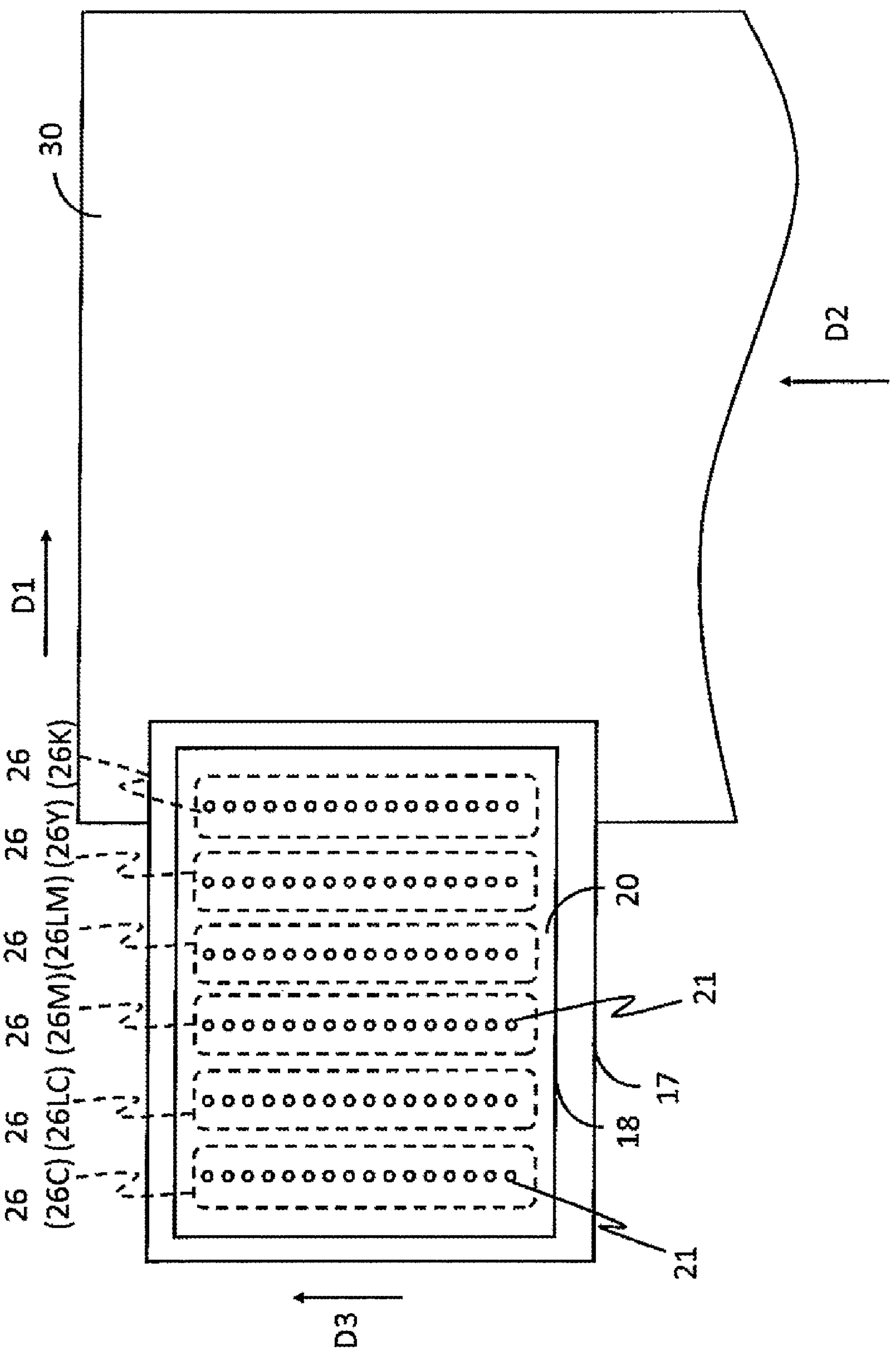
FIG. 3 is a diagram illustrating a relationship between a printing medium and a printing head as viewed from above.

The carriage 17 is a mechanism that can move back and forth in a predetermined direction by receiving the power of a carriage motor not illustrated in the drawing. The predetermined movement direction of the carriage 17 corresponds to the first direction, which is referred to also as main scanning direction. The printing head 18 is mounted in the carriage 17 as illustrated in FIGS. 2 and 3.

The configuration of the printing device 10 illustrated in FIG. 1 may be implemented with one printer, or with a plurality of devices communicatively connected with each other.

That is, the printing device 10 may practically be a printing system. The printing system includes an information processing device that functions as the control unit 11, and a printer including the conveyance unit 16, the carriage 17, the printing head 18 and further the reading unit 19, for example. With the printing device 10 or the printing system described above, the printing method of this embodiment is achieved.

In addition, in the control unit 11, a part functioning as the printing control unit 12*a* and a part functioning as the read control unit 12*b* and the inspection unit 12*c* may be separate information processing devices.

FIG. 2 illustrates a part of the printing device 10, and mainly illustrates a specific example of a configuration including the conveyance unit 16 and the printing head 18. FIG. 2 illustrates the configuration from a perspective orthogonal to a conveyance direction D2 of the printing medium 30.

The conveyance unit 16 includes a feeding shaft 22 on the conveyance upstream side and a winding shaft 25 on the conveyance downstream side. The conveyance upstream side and conveyance downstream side are simply referred to as upstream and downstream, respectively. The long printing medium 30 wound and rolled around the feeding shaft 22 and winding shaft 25 is stretched along the conveyance direction D2. The printing medium 30 is conveyed in the conveyance direction D2. The printing medium 30 may be a sheet or a medium composed of a material other than paper.

In the example illustrated in FIG. 2, when the feeding shaft 22 rotates clockwise, the printing medium 30 wound around the feeding shaft 22 is fed downstream. A front driving roller 23 is provided downstream of the feeding shaft 22, and a rear driving roller 24 is provided upstream of the winding shaft 25. By rotating clockwise, the front driving roller 23 conveys downstream the printing medium 30 fed from the feeding shaft 22. A nip roller 23*n* is provided for the front driving roller 23. By making contact with the printing medium 30, the nip roller 23*n* sandwiches the printing medium 30 between it and the front driving roller 23.

By rotating clockwise, the rear driving roller 24 conveys further downstream the printing medium 30 conveyed downstream by the front driving roller 23. A nip roller 24*n* is provided for the rear driving roller 24. By making contact with the printing medium 30, the nip roller 24*n* sandwiches the printing medium 30 between it and the rear driving roller 24.

The printing head 18 that discharges ink from above to the printing medium 30 is arranged between the front driving roller 23 and the rear driving roller 24. As seen in FIG. 2, the printing head 18 is mounted in the carriage 17. The printing head 18 can discharge inks of a plurality of colors such as cyan (C), magenta (M), yellow (Y), black (K), light cyan (LC) and light magenta (LM), for example.

The nozzles provided in the printing head 18 open at a nozzle surface 20 of the printing head 18 facing the printing medium 30, and the printing head 18 discharges or does not discharge ink from the nozzle on the basis of the printing data described later. The ink discharged by the nozzle is also referred to as ink drop or dot. The printing head 18 may be referred to as printing head, ink-jet head, liquid discharging head, print head and the like. Ink discharging from the nozzle is controlled by the printing control unit 12*a* of the control unit 11.

When the winding shaft 25 rotates clockwise, the printed printing medium 30 conveyed by the rear driving roller 24 is wound around the winding shaft 25.

The feeding shaft 22, the winding shaft 25, the rollers, and motors and the like not illustrated in the drawing for appropriately rotating them are specific examples of the conveyance unit 16 that conveys the printing medium 30. The number and arrangement of rollers provided in the course of the conveyance path for conveying the printing medium 30 are not limited to the illustration in FIG. 2. In addition, the color of the ink discharged by the printing head 18 is not limited to the above-described color. Naturally, a flat platen that supports from blow the printing medium 30 that receives ink discharging from the printing head 18 and the like are provided between the front driving roller 23 and the rear driving roller 24. In addition, a part of the printing medium 30 where printing of the printing head 18 has been performed may be cut by a cutter not illustrated in the drawing from the upstream part in the printing medium 30 so as to be collected, instead of being rolled by the winding shaft 25.

In the example illustrated in FIG. 2, the reading unit 19 is provided at a position downstream of the carriage 17 and the printing head 18 and upstream of the rear driving roller 24. The reading unit 19 optically reads, with an image sensor, the printing medium 30 on which printing has been performed by the printing head 18, and outputs image data as a reading result. The reading unit 19 may have a configuration of reading the printing medium 30 while moving with a carriage as with the printing head 18, or a configuration of performing reading in a stationary state. Note that the reading with the reading unit 19 is controlled by the read control unit 12*b* of the control unit 11, and its scanning result is inspected by the inspection unit 12*c* of the control unit 11.

FIG. 3 schematically illustrates a relationship between the printing medium 30 and the printing head 18 as viewed from above. The printing head 18 mounted in the carriage 17 performs a movement (forward movement) from one end to the other end and a movement (backward movement) from the other end to one end in a main scanning direction D1 together with the carriage 17. The main scanning direction D1 and the conveyance direction D2 intersect each other. This intersection may be interpreted as orthogonal. Accordingly, FIG. 2 illustrates the printing head 18 and the like as viewed in the main scanning direction D1. It should be noted that the main scanning direction D1 and the conveyance direction D2 may not be exactly orthogonal to each other due to various errors in the printer as a product, for example.

FIG. 3 illustrates an example of arrangement of nozzles 21 in the nozzle surface 20. The small circles in the nozzle surface 20 represent the nozzles 21. The printing head 18 includes a plurality of nozzle rows 26 in a configuration of receiving the supply of ink of each color from a liquid holder called ink cartridge or ink tank not illustrated in the drawing and discharging it from the nozzles 21. The nozzle row 26 composed of the nozzles 21 for discharging C ink is referred to also as nozzle row 26C. Likewise, the nozzle row 26 composed of the nozzles 21 for discharging M ink may be referred to as nozzle row 26M, the nozzle row 26 composed of the nozzles 21 for discharging Y ink as nozzle row 26Y, the nozzle row 26 composed of the nozzles 21 for discharging K ink as nozzle row 26K, the nozzle row 26 composed of the nozzles 21 for discharging LC ink as nozzle row 26LC, and the nozzle row 26 composed of the nozzles 21 for discharging LM ink as nozzle row 26LM. The nozzle rows 26C, 26M, 26Y, 26K, 26LC and 26LM are disposed side by side along the main scanning direction D1.

Each nozzle row 26 is composed of a plurality of nozzles 21 with a constant or substantially constant nozzle pitch, which is the distance between the nozzles 21 in the conveyance direction D2. The extending direction of the plurality of nozzles 21 making up the nozzle row 26 is referred to as nozzle row direction D3. In the example illustrated in FIG. 3, the nozzle row direction D3 is parallel to the conveyance direction D2. In a configuration in which the nozzle row direction D3 is parallel to the conveyance direction D2, the nozzle row direction D3 and the main scanning direction D1 are orthogonal to each other. It should be noted that the nozzle row direction D3 may have a configuration in which it is not parallel to the conveyance direction D2 but obliquely intersects the main scanning direction D1.

The positions of the nozzle rows 26C, 26M, 26Y, 26K, 26LC and 26LM in the conveyance direction D2 match each other. The printing device 10 performs printing on the printing medium 30 by performing a combination of conveyance of the printing medium 30 in the conveyance direction D2, and ink discharging with the printing head 18 in conjunction with movement of the carriage 17 along the main scanning direction D1. The forward movement and the backward movement of the carriage 17 are referred to as "scanning" and "path". That is, the printing head 18 discharges ink along with the scanning, i.e., path, of the carriage 17. Movement of the printing head 18 in the main scanning direction D1 along with scanning of the carriage 17 corresponds to relative movement of the printing head 18 with respect to the printing medium 30.

1-2. Test Pattern Printing

Figure 4:
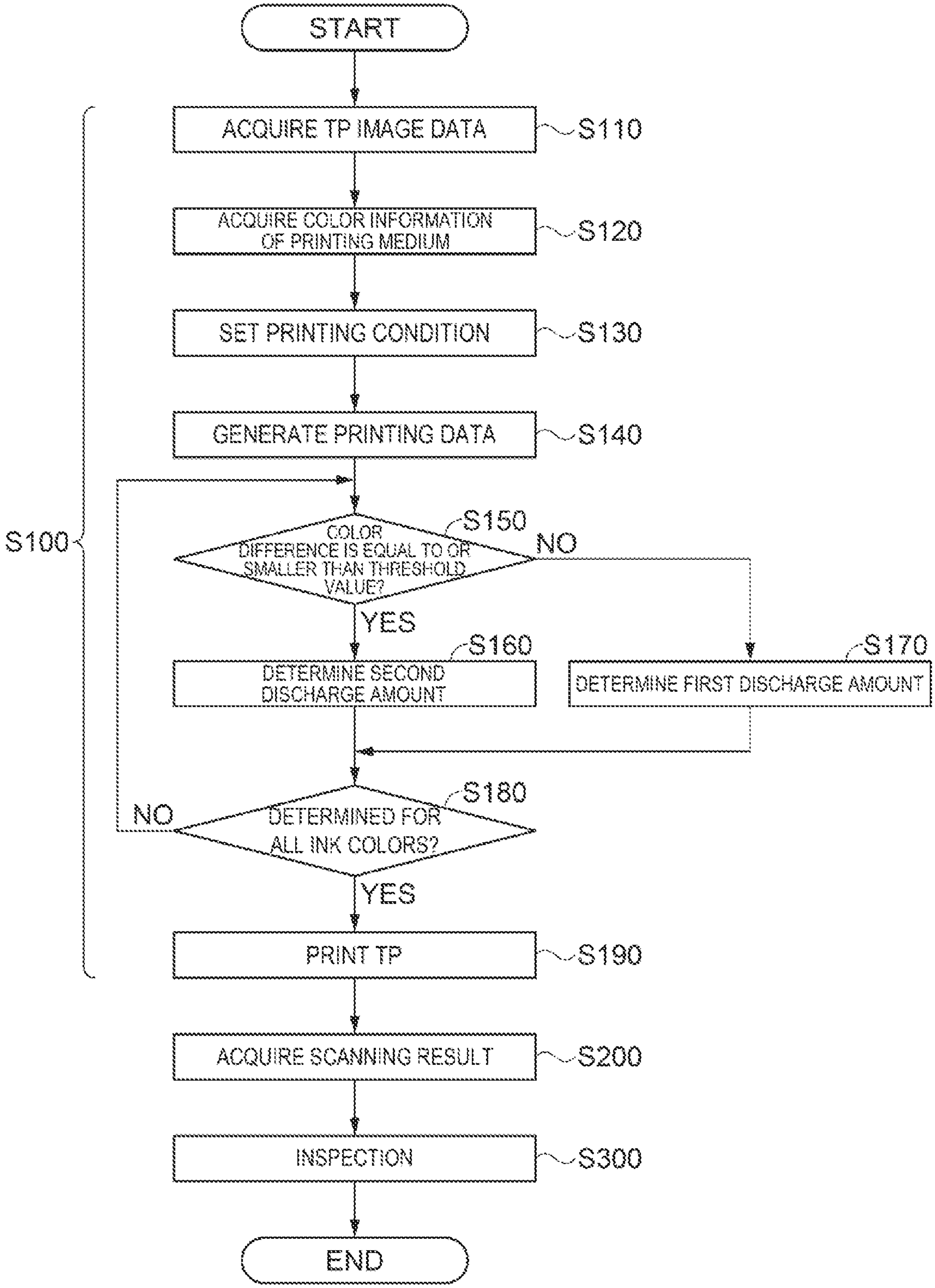
FIG. 4 is a flowchart illustrating a procedure from printing of a TP to inspection.

FIG. 4 is a flowchart illustrating a procedure from printing of a TP to inspection of the nozzles 21 based on the TP, which is performed by the control unit 11 in accordance with a program 12. TP is an abbreviation of test pattern. The flowchart is substantially composed of a TP printing process (step S100), acquisition of a scanning result of a printed TP (step S200), and inspection based on a scanning result of the TP (step S300). The printing of a TP corresponds to test printing, and step S100 corresponds to a test printing step. FIG. 4 specifically illustrates step S100 by dividing it into steps S110 to S190.

At step S110, the printing control unit 12*a* acquires TP image data, which is image data representing a TP, from a storage source such as a predetermined memory and storage device that can be communicated with the control unit 11. The TP image data is image data of a bit map format in which the color of each pixel is defined in a predetermined color system, for example. Here, the color system includes various systems such as an RGB (red, green and blue) color system and a CMYK color system, for example.

At step S120, the read control unit 12*b* acquires the color information of the printing medium 30. The read control unit 12*b* acquires the color information by detecting, with the reading unit 19, the RGB value of the end portion of the printing medium 30 on the downstream side in the conveyance direction D2. Here, the color information is information represented by an RGB (red, green and blue) color system, a CMYK color system and the like, for example. The read control unit 12*b* outputs the acquired color information to the printing control unit 12*a*.

At step S130, the printing control unit 12*a* sets the printing condition of the TP. The printing control unit 12*a* sets the printing condition for normal printing desired by the user as the printing condition of the TP as it is. The normal printing desired by the user is a process of printing objects such as photographs, texts and CGs arbitrarily selected by the user other than a TP. The user can set the printing condition for normal printing by operating the operation reception unit 14 while visually recognizing the user interface (UI) screen displayed on the display unit 13. The printing condition includes the printing quality, for example.

The printing quality is presented to the user in the form of sensory options such as high-definition, normal and fast, and the printing control unit 12*a* sets the items required for performing the printing such as the movement speed of the carriage 17, the conveyance speed of the conveyance unit 16, the waveform of the driving signal used for driving of the nozzles 21, and the driving cycle of the nozzles 21 during the path in accordance with the selection of the printing quality. In addition, an initial setting is prepared for the printing condition, and the printing control unit 12*a* applies the initial setting to the TP printing and the normal printing in the case where the initial setting is not changed by the user.

The execution order of steps S110, S120 and S130 may be different from or substantially the same as the order illustrated in FIG. 4.

At step S140, the printing control unit 12*a* generates printing data for printing a TP from the TP image data. The printing control unit 12*a* generates printing data in which ink discharging (dot on) or ink non-discharging (dot off) is defined for each pixel and for each ink color by performing a predetermined image processing such as color conversion processing and halftone processing on the TP image data as necessary. As exemplified in FIG. 3, when it is assumed that the printing head 18 uses a plurality of color inks, the printing control unit 12*a* generates the printing data in which dot on or off is defined for each pixel and for each ink color on the basis of the TP image data at step S140.

Figure 5:
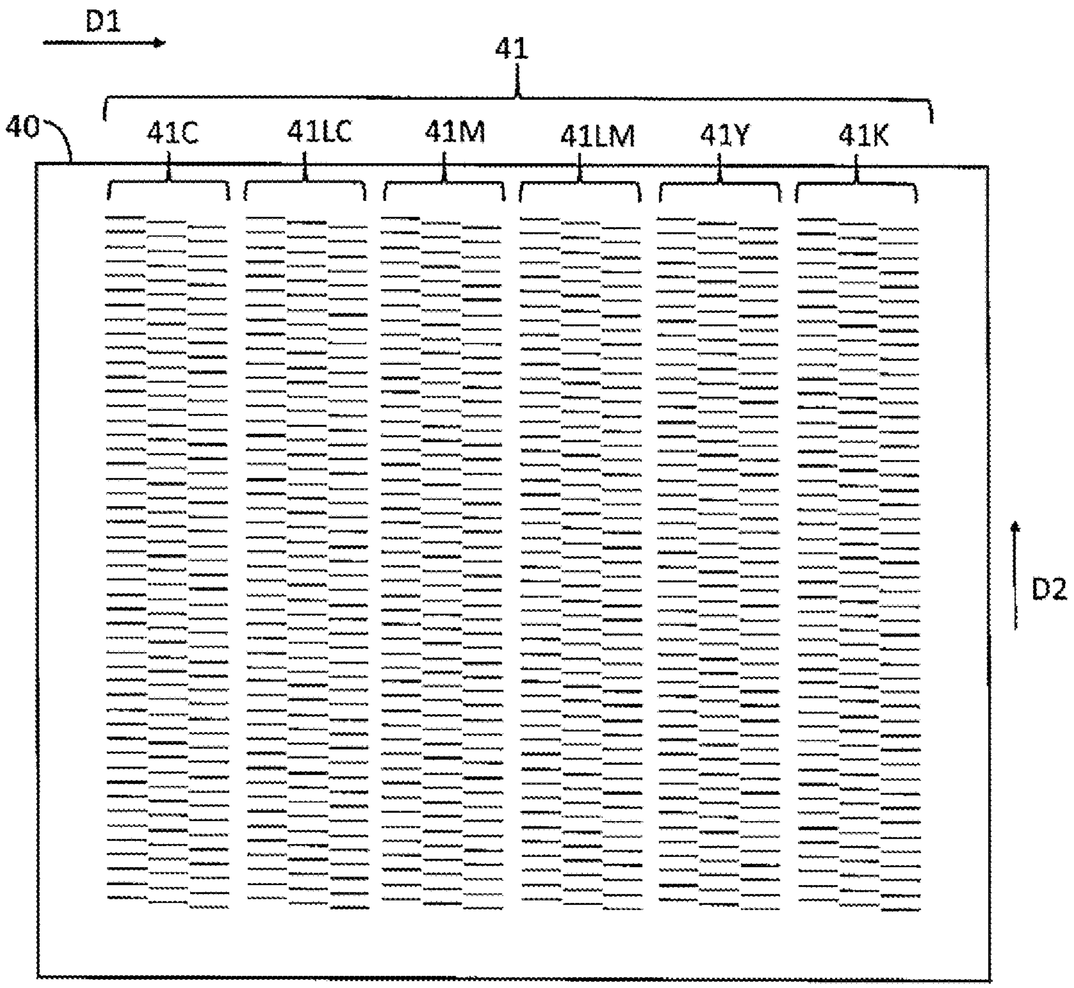
FIG. 5 is a diagram illustrating an example of TP image data.
Figure 6:
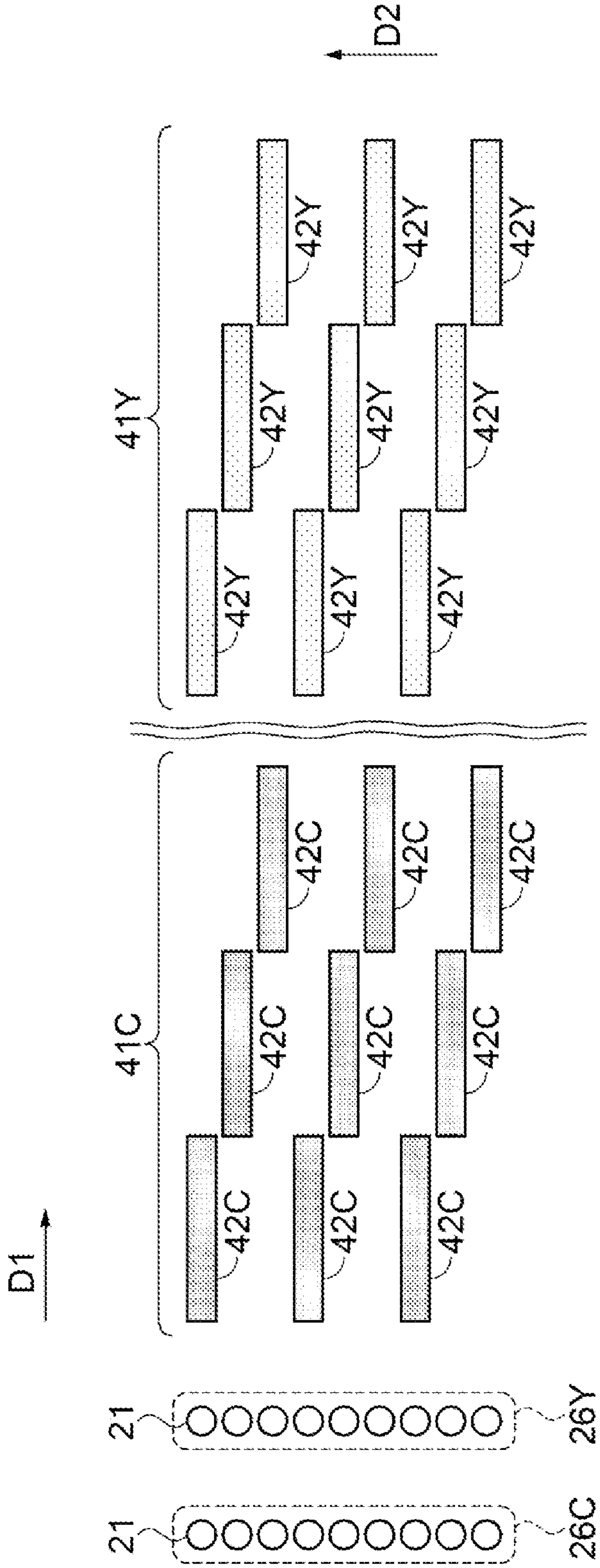
FIG. 6 is a diagram illustrating a part of a TP in an enlarged manner.

FIG. 5 illustrates an example of the TP image data 40 acquired at step S110. The TP image data 40 is image data representing a TP 41. FIG. 5 and FIG. 6 described later also illustrate a correspondence relationship between the TP image data 40, the main scanning direction D1 and the conveyance direction D2. The TP 41 includes the TP for each ink color. In FIG. 5, a TP 41C is a TP expressed with C color. Likewise, a TP 41LC is a TP of LC color, a TP 41M is a TP of M color, a TP 41LM is a TP of LM color, a TP 41Y is a TP of Y color, and a TP 41K is a TP of K color.

In the TP image data 40, the TPs 41C, 41LC, 41M, 41LM, 41Y and 41K of respective ink colors are disposed side by side in a manner corresponding to the main scanning direction D1 at the same position in the conveyance direction D2. Each of the TPs 41C, 41LC, 41M, 41LM, 41Y and 41K of respective ink colors is a set of a plurality of linear "patterns". In the example illustrated in FIG. 5, each pattern is a ruled line with the longitudinal direction in the main scanning direction D1, more specifically, a ruled line parallel to the main scanning direction D1. A single pattern is an image printed with one nozzle 21 of a corresponding ink color.

FIG. 6 illustrates a part of the TP 41 represented by the TP image data 40 in an enlarged manner. More specifically, FIG. 6 illustrates a part of the TP 41C and 41Y. The TP 41C is composed of a plurality of patterns 42C disposed side by side at even intervals in the conveyance direction D2, and the TP 41Y is composed of a plurality of patterns 42Y disposed side by side at even intervals in the conveyance direction D2. In FIG. 6, for the sake of easy understanding, a part of the nozzle rows 26C and 26Y used for the printing of the TP 41C and 41Y are also illustrated together with the TP 41C and 41Y. That is, each pattern 42C is disposed at the same interval as the nozzle pitch in the conveyance direction D2 such that one pattern 42C making up the TP 41C is printed by one nozzle 21 making up the nozzle row 26C. Likewise, each pattern 42Y is disposed at the same interval as the nozzle pitch in the conveyance direction D2 such that one pattern 42Y making up the TP 41Y is printed by one nozzle 21 making up the nozzle row 26Y.

In addition, in the example illustrated in FIG. 6, the patterns 42C are disposed at positions shifted in the main scanning direction D1 such that the positions in the main scanning direction D1 match in three cycles for the purpose of easily detecting each one of them in the inspection. Likewise, the patterns 42Y are also disposed at positions shifted in the main scanning direction D1 such that the positions in the main scanning direction D1 match in three cycles. In this manner, the linear patterns making up the TP 41 are arranged stepwise in units of three pieces for each ink color in the main scanning direction D1. Note that the number of steps is not limited to three as long as a plurality of steps are provided. In addition, the positions of all patterns making up a TP corresponding to one ink color in the main scanning direction D1 may be the same.

The printing data generated at step S140 is image data that expresses, in dot on or off, the TP 41 represented by the TP image data 40 described above. Each pattern making up the TPs 41C, 41LC, 41M, 41LM, 41Y and 41K of respective ink colors is formed of a dot of corresponding ink color only.

At step S150, the printing control unit 12*a* computes the color difference between each ink color of the TP 41 in the TP image data acquired at step S110 and the color of the printing medium 30 acquired at step S120, and determines whether the obtained result is equal to or smaller than a predetermined threshold value. The color difference is represented by the distance in a color space as an example. The distance in the color space can be determined with the following Equation (1) by converting the value in an acquired RGB color system into a value in a L*a*b* color system.

Note that a value in the RGB color system may be converted into a value in the L*a*b* color system by using a conversion method defined for standard (normal) color spaces such as sRGB and AdobeRGB. Alternatively, the calculation may be made by using a publicly known complement computation that refers to a table, stored in advance in a storage source such as a predetermined memory, storage device or the like that can be communicated with the control unit 11, in which the correspondence relationship between the value in the RGB color system and the value in the L*a*b* color system is described.

[Equation 1]

$$\Delta E^* = \sqrt{(L_1^* - L_2^*)^2 + (a_1^* - a_2^*)^2 + (b_1^* - b_2^*)^2} \tag{1}$$

At step S150, first, the printing control unit 12*a* selects one ink used for the printing of the TP 41, and compares the color difference between the ink color and the printing medium 30 with the predetermined threshold value. Then, when the color difference is greater than the predetermined threshold value, the selected ink is classified as "first ink", whereas when the color difference is equal to or smaller than the predetermined threshold value, the selected ink is classified as "second ink". For example, in the case where the color of the printing medium 30 is yellowish and the color difference from C ink is greater than the threshold value while the color difference from Y ink is equal to or smaller than the threshold value, the C ink corresponds to the first ink and the Y ink corresponds to the second ink.

When the color difference between the ink color and the printing medium 30 is equal to or smaller than the predetermined threshold value, the printing control unit 12*a* advances the process to step S160, whereas when it is greater than the predetermined threshold value, the printing control unit 12*a* advances the process to step S170.

At steps S160 and S170, the printing control unit 12*a* determines, for each ink, the discharge amount to be discharged from the nozzles 21 in printing of the TP 41. FIG. 7 illustrates an example of a color-by-color discharge amount table 50 for determining the discharge amount. The color-by-color discharge amount table 50 is stored in advance in a memory or a storage device provided inside or outside the printing device 10 that can be accessed by the control unit 11. The color-by-color discharge amount table 50 is a table defining a parameter for directly or indirectly determining the discharge amount for printing the TP of each ink color on the printing medium 30. In FIG. 7, the color-by-color discharge amount table 50 defines two discharge amounts for each of CMYKLCLM, which are ink colors. One of the discharge amounts is the discharge amount for the case of the first ink where the color difference from the printing medium 30 is greater than the threshold value, and corresponds to a first discharge amount. The other of the discharge amounts is the discharge amount for the case of the second ink where the color difference from the printing medium 30 is equal to or smaller than the threshold value, and corresponds to a second discharge amount. As illustrated in FIG. 7, the second discharge amount, which is the discharge amount of the second ink, is set to a value greater than that of the first discharge amount, which is the discharge amount of the first ink. These discharge amounts are discharge amounts associated with a single scan of the printing head 18. It should be noted that the number of paths for printing the TP 41 is not limited to one, and may be multiple paths. In addition, while, in FIG. 7, a common value is set for all ink colors in both the first discharge amount and the second discharge amount, the value may differ among ink colors.

When it is determined at step S150 that the color difference between the ink color and the printing medium 30 is equal to or smaller than the threshold value and the process is advanced to step S160, the printing control unit 12*a* determines the selected ink discharge amount to be the discharge amount of the second ink, i.e., the second discharge amount. Step S160 corresponds to a second determination step.

For example, a case is specifically described where the color of the printing medium 30 is (R, G, B)=(245, 245, 0), the threshold value is 10, and the ink color is Y ink of (R, G, B)=(240, 240, 0).

(R, G, B)=(245, 245, 0) is (L*, a*, b*)=(94, −15, 91) in the L*a*b* color system, and (R, G, B)=(240, 240, 0) is (L*, a*, b*)=(93, −15, 89) in the L*a*b* color system. Therefore, according to Equation (1), the color difference is $\Delta E^*=2.2$, which is equal to or smaller than the threshold value. Accordingly, at step S160, the discharge amount of the Y ink is determined to be the second discharge amount.

On the other hand, when it is determined at step S150 that the color difference between the ink color and the printing medium 30 is greater than the threshold value and the process is advanced to step S170, the printing control unit 12*a* determines the selected ink discharge amount to be the discharge amount of the first ink, i.e., the first discharge amount. Step S170 corresponds to a first determination step.

For example, a case is specifically described where the color of the printing medium 30 is (R, G, B)=(245, 245, 0), the threshold value is 10, and the ink color is C ink of (R, G, B)=(0, 175, 240).

(R, G, B)=(245, 245, 0) is (L*, a*, b*)=(94, −15, 91) in the L*a*b* color system, and (R, G, B)=(0, 175, 240) is (L*, a*, b*)=(67, −21, 44) in the L*a*b* color system. Therefore, according to Equation (1), the color difference is $\Delta E^*=137.8$, which is greater than the threshold value. Accordingly, at step S170, the discharge amount of the C ink is determined to be the first discharge amount.

At step S180, the printing control unit 12*a* determines whether the discharge amount has been determined for all inks used for the printing of the TP 41. When the discharge amount has been determined for all inks, the process is advanced to step S190. On the other hand, when there is an ink for which the discharge amount has not been determined, one of them is select anew, the process is returned to step S150, and the above-mentioned operation is repeated.

When the process is advanced to step S190, the printing control unit 12*a* prints the TP 41 on the printing medium 30 by controlling the movement of the carriage 17 and the ink discharging of the printing head 18 in accordance with the printing condition set at step S130, the printing data generated at step S140, and the discharge amount determined at steps S160 and S170. More specifically, when printing the TP 41 on the printing medium 30, the printing control unit 12*a* performs control such that the discharge amount of the second ink with the small color difference from the printing medium 30 is larger than the discharge amount of the first ink with the large color difference. In this manner, the TP 41 printed with the second ink can be strongly printed. Note that in the above-described example, the nozzle row 26C that discharges the C ink as the first ink corresponds to a first nozzle row, and the nozzle row 26Y that discharges the Y ink as the second ink corresponds to a second nozzle row. In addition, the TP 41C printed with the first ink corresponds to a first test pattern, and the TP 41Y printed with the second ink corresponds to a second test pattern.

Next, steps S200 and S300 are briefly described.

At step S200, the read control unit 12*b* controls the reading unit 19 to read the printing medium 30 on which the TP 41 has been printed at step S100, and acquires image data as a reading result from the reading unit 19. Naturally, the conveyance unit 16 performs conveyance required for the reading unit 19 to read the printing medium 30 after the printing.

It should be noted that at step S200, it is only necessary to acquire a scanning result of the printing medium 30 on which the TP 41 is printed. As such, the user may cause an external scanner to read the printing medium 30 on which the TP 41 is printed, and the printing device 10 may acquire the obtained scanning result through the communication IF 15.

At step S300, the inspection unit 12*c* inspects the ink discharging state of the nozzles 21 of the printing head 18 on the basis of the image data acquired as a reading result at step S200. The ink discharging state is classified into normal and abnormal. The abnormal means a non-dischargeable state incapable of discharging dots, impinging position displacement with displaced impinging positions of dots from ideal positions, and the like. The inspection unit 12*c* detects each pattern for each ink color and for each of nozzle 21 by analyzing the image data. Then, whether each the nozzles 21 is normal or abnormal is inspected by specifying the density and position of each pattern, and the obtained inspection result is stored in the form of data.

Then, the flowchart of FIG. 4 is completed.

According to this embodiment, in test printing for printing the TP 41, the printing control unit 12*a* discharges ink of the first discharge amount when the difference between the color of the TP 41 and the color of the printing medium 30 is greater than the threshold value, and whereas the printing control unit 12*a* discharges ink of the second discharge amount greater than the first discharge amount when the difference is equal to or smaller than the threshold value. As a result, in the case where the colors of the TP 41 and the printing medium 30 are close to each other, the pattern is strongly formed with the increased discharge amount of the ink and the increased area of the dot forming the pattern, and thus the detection accuracy in the inspection can be improved. More specifically, regarding the TP printed with the second ink with the small color difference from the printing medium 30, while it is difficult to correctly specify the pattern position and the like in the inspection based on the scanning result and consequently the determination whether the nozzles 21 is normal or abnormal cannot be highly accurately performed, the nozzles 21 of any inks can be highly accurately inspected by using the TP 41 printed at step S100 of this embodiment.

In addition, according to this embodiment, a plurality of linear patterns are arranged stepwise in units of steps in the TP 41, and thus interference between adjacent patterns is suppressed even when the printed pattern blurs.

Note that while the TP printed with the first ink and the TP printed with the second ink have the same number of steps in the main scanning direction D1 in the TP 41 in which a plurality of linear patterns are arranged stepwise in this embodiment, the number of steps of the TP printed with the second ink may be greater than the number of steps of the TP printed with the first ink. With this configuration, by increasing the number of steps of the TP that is formed with the second discharge amount and is easily blurred, the distance from the nearby patterns can be increased, and the influence of blurring can be suppressed.

2. Embodiment 2

Embodiment 2 is described below. Note that the same configurations as those of Embodiment 1 are denoted with the same reference numerals, and overlapping description is omitted.

In Embodiment 2, a color-by-color path count table 51 illustrated in FIG. 8 is referenced instead of the color-by-color discharge amount table 50 of FIG. 7.

In Embodiment 2, at step S160 or S170, the printing control unit 12*a* determines the number of scans, i.e., the number of paths, of the carriage 17 with reference to the color-by-color path count table 51. More specifically, the printing control unit 12*a* sets the number of paths in printing of a TP with the second ink where the difference from the color of the printing medium 30 is equal to or smaller than the threshold value to a number greater than the number of paths in printing of a TP with the first ink where the color difference from the printing medium 30 is greater than the threshold value. At this time, any of the first ink and the second ink may be greater in terms of discharge amount of the ink discharged in a single path, but the inks are set such that the second ink is greater in terms of the total discharge amount. Here, the total discharge amount obtained by multiplying the number of paths of the first ink by the discharge amount per path corresponds to the first discharge amount, and the total discharge amount obtained by multiplying the number of paths of the second ink by the discharge amount per path corresponds to the second discharge amount. Note that in FIG. 8, the number of paths of the first ink and the number of paths of the second ink are common values for all ink colors, but may differ depending on the ink colors.

According to this embodiment, when the color difference between the color of the TP 41 and the printing medium 30 is equal to or smaller than the threshold value, the printing control unit 12*a* increases the ink discharge amount by increasing the number of scans of the carriage 17 in printing of the TP 41 than when the color difference is greater than the threshold value. With this configuration, the total discharge amount of the ink is increased by increasing the number of scans, and thus the TP 41 with reduced influence of blurring can be printed than by increasing the discharge amount in a single discharging.

3. Other Embodiments

This embodiment is not limited to the above-described aspect.

For example, while the color information of the printing medium 30 at step S120 is read by the reading unit 19 in the above-mentioned embodiment, this configuration is not limitative. A sensor for acquiring color information may be provided separately from the reading unit 19. In addition, measured color information may be acquired through the communication IF 15, or input by the user through the operation reception unit 14.

The printing device 10 may not be a so-called serial-type ink-jet printer in which the printing head 18 is mounted in the carriage 17 that moves in the main scanning direction D1 as described in the above-mentioned embodiment.

For example, it is possible to assume a case of a so-called line-type ink-jet printer that discharges ink with the printing head 18 extending in the main scanning direction D1 that intersects the conveyance direction D2 and includes, for each ink color, the nozzle row 26 with the length that can cover the width of the printing medium 30. In the line-type ink-jet printer, the nozzle row direction D3 may be regarded as being parallel to the main scanning direction D1, not the conveyance direction D2.

When this embodiment is described assuming that the printing device 10 is a line-type ink-jet printer, the TP 41 illustrated in FIG. 5 is printed on the printing medium 30 such that linear patterns that are ruled lines are orientated parallel to the conveyance direction D2, not the main scanning direction D1. In addition, the path of the printing head 18 implemented multiple times described above is achieved by using back-feeding of the conveyance unit 16. Back-feeding is a process of conveying the printing medium 30 from the downstream side toward the upstream side with the conveyance unit 16. Specifically, when the printing medium 30 passes under the printing head 18 in the process of conveying the printing medium 30 from the upstream side toward the downstream side, printing to the printing medium 30 is performed one time. Thereafter, the conveyance unit 16 performs the back-feeding to move back the part of the printing medium 30 on which printing has been performed one time to the position upstream of the printing head 18, and then starts the conveyance to the downstream side again. By repeating these processes, the TP 41 can be repeatedly printed as with a serial-type ink-jet printer printing the TP 41 in an overlapping manner through multiple paths.

In the case where the printing device 10 is a line-type ink-jet printer, conveyance of the printing medium 30 with the conveyance unit 16 during a printing period of the printing head 18 corresponds to relative movement of the printing head 18 with respect to the printing medium 30.

Naturally, the printing medium 30 may not be the rolled continuous sheet exemplified in FIG. 2 or the like. The printing medium 30 may be a single-cut sheet cut in a page unit and the like.

The shape of the TP 41 is not limited to the linear pattern having the length in the main scanning direction D1 illustrated in FIGS. 5 and 6. For example, the present disclosure is applicable to a test pattern for correcting the errors between the impinging position in the forward scanning of the carriage and the impinging position in the backward scanning in a serial-type device that discharges liquid along with the scanning of the carriage. In this case, at step S300, the inspection unit 12*c* detects the difference between the impinging position in the forward scanning and the impinging position in the backward scanning on the basis of the scanning result obtained at step S200.

The shape of the TP 41 is not limited to the stepwise pattern in which the steps are shifted from each other in the main scanning direction D1 and the conveyance direction D2 as illustrated in FIGS. 5 and 6. It should be noted that the stepwise pattern may be printed only at a location where blurring easily occurs due to the increased discharge amount because forming the stepwise pattern increases the distance from the front and rear steps, thus providing a pattern that less affects the reading accuracy even with blurring of the pattern.

The shape of the TP 41 is not limited to the same shape for all inks as illustrated in FIGS. 5 and 6. For example, the shape may be formed such that in the TP printed with the first ink, the linear pattern is shifted only in the conveyance direction D2 without shifting the linear pattern in the main scanning direction D1, whereas in the TP printed with the second ink, the linear pattern is shifted in the main scanning direction D1 and the conveyance direction D2 into a stepwise arrangement. With such a configuration, in the second ink, which has a large discharge amount and is easily blurred than the first ink, it is possible to suppress the reduction in detection accuracy due to the interference with nearby front and rear patterns due to the blurring.

The TP 41 is not limited the configuration in which a plurality of TPs with different ink colors are disposed side by side in the main scanning direction D1 as illustrated in FIG. 5. For example, it is also possible to adopt a configuration in which they are arranged in the conveyance direction D2 for each color, or in units of a plurality of colors.

Note that while the distance in the color space is calculated by using the L*a*b* color system as the color difference in this embodiment, the calculation method for the color difference is not limited to this method. For example, it is possible to calculate the Euclidean distance in the color space in the RGB color system. In this case, the color difference and the threshold value are compared with each other by appropriately using an appropriate threshold value in accordance with the calculation method for the color difference.

What is claimed is:

1. A printing device, comprising:

a printing head including a nozzle row in which a plurality of nozzles configured to discharge liquid to a medium are arranged; and a control unit configured to control discharge of the liquid from the plurality of nozzles, wherein the printing head is configured to discharge the liquid along with scanning that is a relative movement in a predetermined direction with respect to the medium, and in test printing for printing a test pattern on the medium, the control unit performs control such that the liquid of a first discharge amount is discharged from the plurality of nozzles when a color difference between the test pattern and the medium is greater than a predetermined threshold value, and the liquid of a second discharge amount that is greater than the first discharge amount is discharged from the plurality of nozzles when the color difference between the test pattern and the medium is equal to or smaller than the threshold value.

2. The printing device according to claim 1, wherein when the color difference between the test pattern and the medium is equal to or smaller than the threshold value, the control unit increases a discharge amount of the liquid by increasing the number of scanning by the printing head for printing the test pattern, compared to when the color difference is greater than the threshold value.

3. The printing device according to claim 1, wherein when a color difference between the test pattern and the medium is equal to or smaller than the threshold value, compared to when the color difference is greater than the threshold value, the control unit increases a discharge amount of the liquid discharged when the printing head performs scanning once.

4. The printing device according to claim 1, wherein the test pattern is printed using the liquid discharged from each of the plurality of nozzles, and includes a plurality of linear patterns having a length along a first direction intersecting an extending direction of the nozzle row.

5. The printing device according to claim 4, wherein the plurality of linear patterns are arranged stepwise in units of a plurality of steps.

6. The printing device according to claim 5, wherein when a color difference between the test pattern and the medium is equal to or smaller than the threshold value, the control unit increases the number of steps in the first direction, compared to when the color difference is greater than the threshold value.

7. The printing device according to claim 5, wherein the printing head includes, as the nozzle row, a first nozzle row and a second nozzle row aligned in the first direction, the control unit prints, as the test pattern, a first test pattern and a second test pattern so as to be aligned in the first direction, the first test pattern being printed by discharging the first discharge amount of the liquid from the first nozzle row, the second test pattern being printed by discharging the second discharge amount of the liquid from the second nozzle row, the plurality of linear patterns forming the first test pattern and the second test pattern are arranged stepwise respectively in units of a plurality of steps, and the second test pattern has a larger number of steps in the first direction than the first test pattern.

8. A printing method of a printing device provided with a printing head including a nozzle row in which a plurality of nozzles configured to discharge liquid to a medium are arranged, the printing device being configured to discharge the liquid from the printing head along with scanning that is a relative movement in a predetermined direction with respect to the medium, the printing method comprising a test printing step of printing a test pattern on the medium, the test printing step including:

a first determination step of determining, to a first discharge amount, a discharge amount of the liquid to be discharged from the plurality of nozzles when a color difference between the test pattern and the medium is greater than a predetermined threshold value; and a second determination step of determining, to a second discharge amount that is greater than the first discharge amount, the discharge amount of the liquid to be discharged from the plurality of nozzles when the color difference between the test pattern and the medium is equal to or smaller than the threshold value.

* * * * *